United States Patent
Boolish et al.

(10) Patent No.: US 10,700,362 B2
(45) Date of Patent: Jun. 30, 2020

(54) COATINGS FOR MITIGATION OF COIN CELL INGESTION

(71) Applicant: Energizer Brands, LLC, St. Louis, MO (US)

(72) Inventors: Marc Boolish, Avon Lake, OH (US); Michael Wemple, Westlake, OH (US)

(73) Assignee: Energizer Brands, LLC, St. Louis, MO (US)

( * ) Notice: Subject to any disclaimer, the term of this patent is extended or adjusted under 35 U.S.C. 154(b) by 181 days.

(21) Appl. No.: 15/696,947

(22) Filed: Sep. 6, 2017

(65) Prior Publication Data

US 2018/0076467 A1 Mar. 15, 2018

Related U.S. Application Data

(60) Provisional application No. 62/395,093, filed on Sep. 15, 2016.

(51) Int. Cl.

| | |
|---|---|
| *H01M 6/14* | (2006.01) |
| *H01M 4/04* | (2006.01) |
| *H01M 4/134* | (2010.01) |
| *H01M 4/62* | (2006.01) |
| *H01M 10/0568* | (2010.01) |
| *H01M 4/38* | (2006.01) |
| *H01M 10/052* | (2010.01) |

(52) U.S. Cl.
CPC ............... *H01M 6/14* (2013.01); *H01M 4/04* (2013.01); *H01M 4/134* (2013.01); *H01M 4/382* (2013.01); *H01M 4/628* (2013.01); *H01M 10/052* (2013.01); *H01M 10/0568* (2013.01); *H01M 2220/30* (2013.01); *Y02T 10/7011* (2013.01)

(58) Field of Classification Search
CPC ...... H01M 4/628; H01M 4/134; H01M 4/382; H01M 222/30; H01M 6/14; H01M 10/0568; H01M 10/0569; H01M 10/052; H01M 10/0525; H01M 2220/30; Y02T 10/7011
USPC ......................................................... 429/94
See application file for complete search history.

(56) References Cited

U.S. PATENT DOCUMENTS

| | | | |
|---|---|---|---|
| 4,011,371 A | 3/1977 | Hallett et al. | |
| 4,107,403 A | 8/1978 | Takamura et al. | |
| 4,258,108 A | 3/1981 | Glaser | |
| 5,069,989 A | 12/1991 | Uetani et al. | |
| 7,854,745 B2 * | 12/2010 | Brister | A61F 5/003 606/196 |

(Continued)

FOREIGN PATENT DOCUMENTS

| | | |
|---|---|---|
| AU | 2006203603 A1 | 3/2007 |
| CN | 104269560 A | 1/2015 |

(Continued)

OTHER PUBLICATIONS

US 8,388,533 B2, 03/2013, Hafezi et al. (withdrawn)

*Primary Examiner* — Amanda C. Walke
(74) *Attorney, Agent, or Firm* — Foley & Lardner LLP

(57) ABSTRACT

A system and method for mitigating the impact of ingested lithium coin cell batteries is described. A coating is provided on an exterior facing of the cell, preferably within the crimp region, which releases acid and/or other additives. These acids and/or additives are selected to neutralize hydroxide that may evolve from hydrolysis of saliva that occurs if/when the coin cell becomes lodged in the digestive tract.

18 Claims, 4 Drawing Sheets

(56) References Cited

U.S. PATENT DOCUMENTS

| | | |
|---|---|---|
| 8,258,962 B2 | 9/2012 | Robertson et al. |
| 9,865,862 B2 * | 1/2018 | Ok ..................... H01M 2/0222 |
| 2003/0035994 A1 | 2/2003 | Zavilenski |
| 2006/0093908 A1 * | 5/2006 | Hwang ............... H01M 2/0257 |
| | | 429/185 |
| 2008/0146871 A1 * | 6/2008 | Arneson ............. A61B 5/0002 |
| | | 600/101 |
| 2010/0087885 A1 | 4/2010 | Atanasoska et al. |
| 2012/0059257 A1 | 3/2012 | Duck et al. |
| 2012/0258346 A1 | 10/2012 | Godden |
| 2012/0321937 A1 | 12/2012 | Hutzler et al. |
| 2013/0104796 A1 | 5/2013 | Bhat et al. |
| 2013/0143104 A1 | 6/2013 | Schein et al. |
| 2013/0144132 A1 | 6/2013 | Hafezi et al. |
| 2013/0202922 A1 | 8/2013 | Dipietro et al. |
| 2014/0030570 A1 | 1/2014 | Imanishi et al. |
| 2014/0170074 A1 | 6/2014 | Ok |
| 2014/0356699 A1 | 12/2014 | Deligianni et al. |
| 2015/0020436 A1 | 1/2015 | James |
| 2015/0118526 A1 | 4/2015 | Bettinger et al. |
| 2016/0020436 A1 | 1/2016 | Laulicht et al. |
| 2016/0211501 A1 * | 7/2016 | Ok ..................... H01M 2/0222 |
| 2016/0226039 A1 | 8/2016 | Kuo et al. |
| 2017/0062829 A1 * | 3/2017 | Ryu ................... H01M 10/0569 |
| 2018/0138467 A1 * | 5/2018 | Takahashi ........... H01M 2/0222 |
| 2019/0058182 A1 * | 2/2019 | Pozin ................. H01M 2/0202 |

FOREIGN PATENT DOCUMENTS

| | | |
|---|---|---|
| DE | 102007018259 A1 | 10/2008 |
| EP | 2528130 A1 | 11/2012 |
| EP | 2803096 A1 | 11/2014 |
| EP | 3292581 A1 | 3/2018 |
| EP | 3292586 A1 | 3/2018 |
| GB | 2254806 A | 10/1992 |
| GB | 2265807 A | 10/1993 |
| IT | 8022056 | 5/1980 |
| JP | S53-59828 A | 5/1978 |
| JP | S56-30249 A | 3/1981 |
| JP | S59-29353 A | 2/1984 |
| JP | S59-31554 A | 2/1984 |
| JP | S59-40458 A | 3/1984 |
| JP | S59-42764 A | 3/1984 |
| JP | S59-42765 A | 3/1984 |
| JP | S59-44762 A | 3/1984 |
| JP | S59-44763 A | 3/1984 |
| JP | S59-44764 A | 3/1984 |
| JP | S59-51455 A | 3/1984 |
| JP | S59-57684 A | 4/1984 |
| JP | S59-111252 A | 6/1984 |
| JP | S59-111257 A | 6/1984 |
| JP | S59-169055 A | 9/1984 |
| JP | S59-211955 A | 11/1984 |
| JP | S61-04154 A | 1/1986 |
| JP | H04-312762 A | 11/1992 |
| JP | H08-203484 A | 8/1996 |
| JP | H09-192580 A | 7/1997 |
| JP | 2015-111500 A | 6/2015 |
| JP | 2017-126420 A | 7/2017 |
| JP | 2017-126543 A | 7/2017 |
| JP | 2017-162771 A | 9/2017 |
| JP | 2017-168205 A | 9/2017 |
| JP | 2017-168238 A | 9/2017 |
| KR | 2013-0093183 A | 8/2013 |
| WO | WO 2007/022563 A1 | 3/2007 |
| WO | WO 2009/111664 A2 | 9/2009 |
| WO | WO 2010/019778 A2 | 2/2010 |
| WO | WO 2010/040065 A1 | 4/2010 |
| WO | WO 2010/129288 A2 | 11/2010 |
| WO | WO 2010/132331 A2 | 11/2010 |
| WO | WO 2012/039632 A2 | 3/2012 |
| WO | WO 2012/138354 A1 | 10/2012 |
| WO | WO 2012/164429 A1 | 12/2012 |
| WO | WO 2013/106821 A1 | 7/2013 |
| WO | WO 2013/114235 A1 | 8/2013 |
| WO | WO 2013/126627 A1 | 8/2013 |
| WO | WO 2013/165961 A1 | 11/2013 |
| WO | WO 2014/017103 A1 | 1/2014 |
| WO | WO 2014/164098 A1 | 10/2014 |
| WO | WO 2016/103590 A1 | 6/2016 |
| WO | WO 2016/179499 A1 | 11/2016 |
| WO | WO 2016/179501 A1 | 11/2016 |
| WO | WO 2016/179504 A1 | 11/2016 |
| WO | WO 2016/179507 A1 | 11/2016 |
| WO | WO 2016/179508 A2 | 11/2016 |
| WO | WO 2017/122252 A1 | 7/2017 |

\* cited by examiner alginic acid

EDTA

Nafion™ melitic acid poly(allylaamine hydrochloride)

poly(acrylic acid-co-maleic acid)

phytic acid

COATINGS FOR MITIGATION OF COIN CELL INGESTION

CROSS-REFERENCE TO RELATED APPLICATIONS

This patent application claims priority from Provisional Patent Appl. Ser. No. 62/395,093, filed Sep. 15, 2016, which is incorporated herein by reference in its entirety.

FIELD

The present technology relates to mitigating the harmful effects associated with unintended ingestion of lithium coin cell batteries. In particular, the present technology describes systems, methods, compounds and apparatus for mitigating the conditions that arise when such batteries become lodged in a person's esophagus.

BACKGROUND

Many electronic devices, including watches, remotes, toys, and other devices, leverage the benefits delivered by lithium coin cell batteries. These primary power sources are thin, portable, and affordable, in addition to providing reasonably high voltage and capacity. As such, the use and further adoption of primary (i.e., non-rechargeable) lithium coin cell batteries is expected to continue to grow for the foreseeable future.

Lithium coin cell batteries come in a variety of sizes, although they are generally small, circular discs possessing standardized dimensions and nominal voltages. Exemplary sizes, with reference to their International Electrotechnical Commission designations include CR2016, CR2025, and CR2032, which are generally 20 mm in height and 1.6 mm, 2.5 mm, and 3.2 mm (respectively speaking) in diameter, and all possess a lithium-manganese dioxide chemistry producing a nominal voltage of 3.2 volts. Many coin cell manufacturers prefer to impart reflective and/or high quality metals, plating, or coatings on the outer casings of such batteries in order to improve their appearance and/or performance.

Unfortunately, the size and appearance of these batteries have led to individuals ingesting the batteries, particularly infants and small children. Numerous cases have been documented in which these batteries have been accidentally ingested, and in some instances the battery becomes lodged in the digestive tract (and especially the esophagus with respect to children), choking, severe injuries, and even deaths have been reported.

In most cases of battery ingestion and especially those in which young child is involved, it may not be possible to determine the existence of a problem until well after the onset of serious health problems. Moreover, information about when and what type of battery was ingested cannot be easily established, which makes it extremely difficult to verify the nature of the problem and devise appropriate medical interventions in response to it.

The battery and device manufacturing industries have recently begun developing measures to reduce the possibility of accidental swallowing of foreign objects, such as improved packaging, warning labels, and screw-fastened battery compartments on devices. However, numerous incidents result from an unsupervised child ingesting a loose battery that was been left unattended after removal from its original package or from a device.

The present inventors have found that ingested batteries lodged in the esophagus lead to an electrochemical interaction between the battery and human tissue. Keeping in mind that water in saliva may undergo an electrolysis reaction producing hydrogen gas and hydroxide ions, the ingested, lodged battery can produce electrical current causing the in situ electrolysis of saliva and localized alkaline burns/perforations of the esophagus.

Past disclosures did not fully appreciate the reaction mechanisms and resulting dangers caused by ingested coin cells remaining lodged in the digestive tract. For example, U.S. Pat. No. 5,069,989 describes an alkaline battery cell design intended to avoid corrosion of the positive electrode by acidic gastric juices found in the stomach. Specifically, a corrosion-resistant container consisting of a stainless steel having more than 23% chrome is proposed, with the preferred embodiment having a nickel coating layer on the positive electrode can intended to prevent the release of hexachrome ions from the stainless steel.

International Patent Publication No. WO 2013/106821 describes the use of specific grades of stainless steel and/or metal coatings or claddings for use on the exterior of coin cells. This publication theorizes that the use of exterior materials with sufficiently high overpotentials for the reactions inherent to electrolysis and/or the concomitant metallic oxidation of the casing should reduce or eliminate the localized, in situ formation of hydroxide by ingested and lodged coin cells. However, subsequent experimentation suggests that even the slightest imperfection in these materials severely reduces or entirely eliminates the efficacy of this proposed solution. Accordingly, while based on theoretically sound principles, this publication has proven impractical owing to constraints in how cell casings must currently be manufactured.

Other prior publications indicate more passive solutions. For example, United States Patent Publication No. 2014/170074 describes compositions and methods for deterring and/or visually identifying oral contact/ingestion of coin cells. In particular, emetics, aversives, and colorants are applied to the exterior of the cell via a carrier. These additives, respectively speaking, are intended to induce vomiting, create unpalatable tastes, and provide an indication that the cell has come into contact with saliva. However, in the event the coin cell is swallowed using these or other similar approaches (e.g., see United States Patent Publication No. 2014/0030570; International Patent Publication No. WO 2012/164429: Japanese Patent Publication Nos. JP S5929353, JP S5951455, JP H04312762, and JP S59211955; and Great Britain Patent Publication Nos. GB 2254806 and GB 2265807), immediate medical intervention is still required, as these solutions do nothing to mitigate the problematic electrolysis reaction byproducts.

Still other approaches contemplate altering the conditions under which the coin cell can be discharged in the first instance. Fundamentally, these solutions are premised on redesigning battery compartments to exert unique forces on the battery casing. As one example, United States Patent Publication No. 2015/0020436 discloses a conductive, pressure-sensitive coating that ensures that the battery only delivers current when sufficient compression is delivered. Other physically activated, pressure-sensitive switches integrated within the battery housing have also been contemplated.

Separately, 1.5 volt alkaline button cells are known to leak in certain environmental conditions (e.g., high humidity). Known solutions to this problem rely upon retaining the structural integrity of button cells (and other batteries containing alkaline solutions) by preventing or mitigating the leakage/unwanted release of harmful or toxic materials already contained within the cell. U.S. Pat. No. 4,258,108 discloses a moisture-protected, sealed ring including anhydrous, weak inorganic acids that bind alkaline electrolyte that might escape from the cell. U.S. Pat. No. 4,107,403 describes an edge portion coating provided to electrochemical cells including a thermoplastic resin containing hydrogen bonding functional groups. In each instance, these solutions contemplate the release of existing materials from the battery under expected or ambient conditions and, therefore, are not analogous to the unique complications presented by ingestion of higher voltage coin cells.

Given these proposals, it is desirable to provide for an electrochemical cell construction that can mitigate or delay damage to human tissue from inadvertent ingestion by responding to the conditions provoked by that ingestion.

BRIEF SUMMARY

The present technology provides, in one aspect, an electrochemical cell having an exterior coating. Preferably, the coating may be located proximate to the crimped seal. The coating comprises sufficient acid to neutralize hydroxide that might be formed in the event the cell were lodged in the esophagus (or other tissue) so as to induce the electrolysis of water or saliva. Additional embodiments contemplate the provision of materials that create sufficient amounts of hydrogen ions ($H^+$) when the cell is lodged, at least partially submerged (or in contact with a source of water), and exposed to conditions that would otherwise induce the creation of hydroxide as the lodged cell discharges.

Thus, in one embodiment, a battery comprising any combination of the following:

A negative electrode containing an active material, such as lithium;

A positive electrode containing an active material, such as manganese dioxide;

An ionically conductive electrolyte;

A separator positioned between the positive and negative electrodes;

A container having an external facing and an interior for receiving at least a portion of the positive electrode;

A cup having an external facing and an interior for receiving at least a portion of the negative electrode;

A sealing gasket for hermetically sealing the battery, said gasket positioned between the container and the cup; and A coating applied to a portion of at least one of the external facing of the container and the external facing of the cup, said coating comprising a material selected to mitigate generation of hydroxide ions associated with electrolytic decomposition of water.

In another embodiment, a coin cell is contemplated with any combination of the following features:

an outer surface including a positive contact surface and a negative contact surface;

a coating including a pH reducing substance disposed on the outer surface of the coin cell;

a crimp or seal area adjacent the positive contact surface and the negative contact surface;

wherein the coating is at least partially applied to the crimp or seal area;

wherein the pH reducing substance is an acidic substance;

wherein the acid is citric acid;

wherein the acid is a food grade acid suitable for human consumption; and wherein the coating further comprises an adhesive with the pH reducing substance dispersed therein.

In another embodiment, a method for mitigating the harmful effects of human ingestion of a coin including a positive contact surface and a negative contact surface is contemplated with any combination of the following features:

applying a coating to at least a portion of the outer surface of the coin cell, the coating comprising a pH reducing substance; and dispersing the pH reducing substance in an adhesive prior to or concurrent with applying the coating.

In further embodiment, a coating for mitigating harmful effects of human ingestion of a coin cell is contemplated. The coating comprises any combination of the following features:

an adhesive, a pH reducing substance, wherein the pH reducing substance is dispersed in the coating, and wherein the coating is formulated to be a food grade coating and that the adhesive will release the pH reducing substance from the coating upon being subjected to a predetermined condition.

The foregoing embodiments are merely exemplary of some of the aspects of the coin cell, coating, and method. Additional features and elements may be contemplated and described herein. Also, features from one of the foregoing embodiments may be combined with features from any of the other foregoing embodiments.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
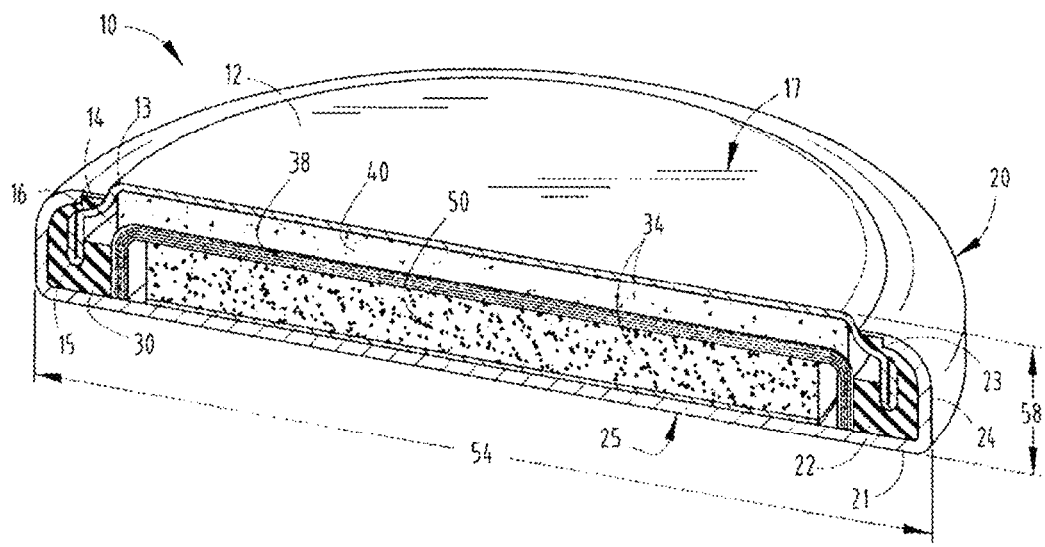
FIGS. 1 and 2 are illustrations of the components of a typical coin cell battery according to certain embodiments of the disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, unless context suggest otherwise, the articles "a" and "an" are generally intended to mean "one or more" and the use of plural may be exemplary rather than mandatory.

Unless noted to the contrary, all methods and experiments contemplate ambient environmental conditions, including temperature and pressure. Further, common analytical instruments and/or laboratory techniques—including but not limited to standardized testing protocols such as those published by the American National Standards Institute and other, similar organizations—may be used to inform the methods, compositions and other material characteristics disclosed herein.

To the extent certain aspects of this disclosure involve saliva, saliva can be represented by the following composition (to the extent standardized and/or large quantities are required): 1 liter of de-ionized water thoroughly mixed with 0.4 g of KCl; 0.4 g NaCl; 0.906 g of $CaCl_2$; 0.560 g $Na_3PO_4 \cdot 12H_2O$; 1 g urea; and 2 mL of 10% $H_3PO_4$. Alternatively, small quantities of human saliva may also be used, although it will be understood that such samples may possess inherent variabilities depending upon subject and/or conditions in which the samples are collected.

It should also be noted that, in an electrochemical cells, the anode is the negative electrode and the cathode is the positive electrode. However, in electrolysis cells, the terminology is reversed so that the oxidation reaction occurs at the anode/positive terminal and the reduction reaction at the cathode/negative terminal. Unless specifically noted or suggested by the context, the default assumption in this disclosure will be to use the electrochemical cell terms throughout this disclosure.

As described more fully in International Patent Publication No. WO 2013/106821, which is incorporated by reference, a number of different hydrolysis reactions may occur at the negative terminal of a nominal 3.0 volt (direct current) lithium coin cell submerged in saliva:

   (1n)

   (2n)

   (3n)

   (4n)

Reaction 1n is most typical, while reactions 3n and 4n only occur in the event the saliva is acidic in nature (e.g., owing to recent food consumption by the subject or other natural variations, although saliva normally tends to be neutral).

At the corresponding positive terminal of the submerged battery, a number of reactions may occur. Here again, the acidic or alkaline nature of the saliva may influence the reactions, as will the presence of nickel and/or iron from the materials along the surface of the cell casing. As previously noted, even small pin holes or minor imperfections in cladding or coating may expose sufficient amounts of nickel and/or iron to drive these reactions.

   (1p)

   (2p)

   (3p)

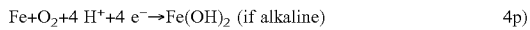   (4p)

Reaction 1p is usually most dominant, although the metallic dissolution reactions in 2p, 3p, and 4p would be dictated by the surrounding environment. To the extent reactions 2p and/or 4p may occur, they further contribute to the localized, in situ formation of hydroxide ions.

Taken together, the dominant reaction mechanisms 1n and 1p will occur only if their thermodynamic potential of 1.23 volts is provided. Thus, if the ingested battery can deliver that voltage, there is a high likelihood of damaging hydroxide being generated locally. Given that alkaline coin and button cells have a nominal voltage of 1.5 volts and discharge at voltages substantially less than that nominal voltage (i.e., under typical discharge conditions, these cells usually decline in voltage throughout discharge, with a substantial portion of the discharge occurring at or less than 1.2 volts and with final cutoff voltages between 0.9 and 1.1 volts), lithium coin cells are much more likely to produce problematic hydroxide generation due to electrolysis of saliva if/when the cells become lodged in the digestive tract.

As a final note, if the saliva contains a sufficient amount of sodium chloride (e.g., table salt), the additional following reaction may also contribute to the damaging generation of hydroxide:

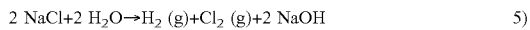   (5)

While localized variations in pH levels are believed to be responsible for the injuries caused by ingested, lodged lithium coin cells, pH changes are sensitive to experimental conditions, including the amount of exposed surface area on the battery casing, the amount of saliva present and the means and location of the pH measurement device. Thus, any pH measurements are most useful when considered in a comparative context only, and care must be taken to properly account for standardized measurements before presuming the disclosure of a particular pH range in one document may be relevant to that of another are most useful when considered in a comparative context only, and care must be taken to properly account for standardized measurements before presuming the disclosure of a particular pH range in one document may be relevant to that of another.

It may also be possible to quantify the extent of unwanted electrolytic activity between the terminals when a "live" cell is placed in water or saliva by measuring the amount of metal lost from the container and/or dissolved into solution. Thus, elemental analysis by Inductively Coupled Plasma (ICP) mass spectrometry or other known means may be useful in determining the presence of metallic species.

Figure 2:
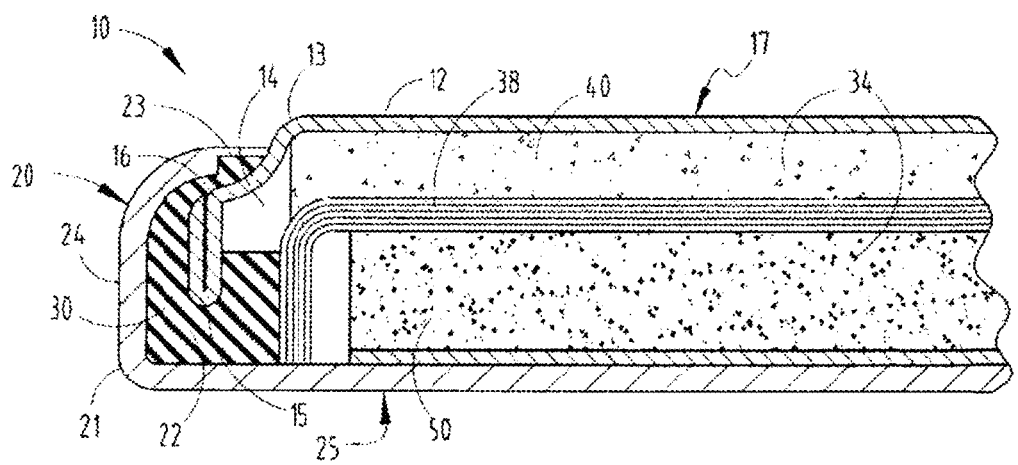

FIGS. 1 and 2 depict one arrangement for an electrochemical coin cell 10, although alternative orientations and arrangements of the components are possible. As such, the details disclosed are exemplary and should not be considered as limiting except as appropriate to the context.

Electrochemical coin cell 10 includes a negative terminal 12 (i.e., the cell cap or cup) having a closed end 13, an open end 14 with an edge 15, and side wall 16 extending between ends 13, 14. The negative terminal 12 is made from an electron-conducting material that is resistant to corrosion and other unwanted reactions. Exemplary materials for this terminal are various grades of steel, stainless steel, nickel plated steel, and various other materials. Additionally or alternatively, the exterior surface 17 of anode terminal 12 may be plated, coated, sputtered, cladded, or otherwise covered metals selected to enhance performance and/or appearance of the cell 10.

The electrochemical coin cell 10 also includes a positive terminal 20, also having a closed end 21, an open end 22 with a terminal edge 23, and a side wall 24 extending between the ends 21, 22. As with the anode cup 12, cathode container 20 is comprised of an electron-conducting material resistant to unwanted reactions. In particular, metals and various grades of steel may be appropriate.

Coin cell 10 further includes a sealing gasket 30 between anode terminal 12 and cathode terminal 20. The gasket 30 is typically made from an electrically nonconductive, elastomeric material that may provide a compressive seal between terminals 12, 20. The material used for gasket 30 must also be selected with reference to its stability in the presence of an electrolyte, its resiliency and its resistance to cold flow. Exemplary materials for gasket 30 may be nylon, polytetrafluoroethylene, fluorinated ethylene-propylene, chlorotrifluoroethylene, perfluoroalkoxy polymer, polyvinyls, polyethylene, polypropylene, polystyrene, polysulfone, and the like.

An electrolyte 34 must also be provided to cell 10. Electrolyte selection is dependent upon the active materials, anticipated discharge conditions for the cell 10, and a host of other factors. For example, electrolyte 34 may be composed of a composition of at least one lithium salt dissolved in an organic solvent or a blend of organic solvents. Suitable salts for use in lithium coin cells are lithium trifluoromethanesulfonate, lithium trifluoromethanesulfonimide, lithium perchlorate, lithium tetrafluoroborate, lithium hexafluorophosphate, or their combination. Common organic solvents used in lithium coin cells are propylene carbonate and 1, 2-dimethoxyethane. Other salts and solvents are also known.

The anode 40 comprises an electrochemically active material, such as lithium, lithium alloys, and/or various other alkaline and other metals suitable for serving as an anode in an electrochemical cell. The cathode 50 can be composed of various materials suitable for use as a cathode in a lithium-based electrochemical cell. In one embodiment, cathode 50 is primarily composed of manganese dioxide, although fluorinated carbon materials, and other primary cathode active materials are known in this field.

A separator 38 is disposed between anode 40 and cathode 50 to provide from electrical insulation and ionic conduction between these electrodes. Separator 38 can be composed of any of a variety of polymeric materials. For example, separator 38 may be formed from a polypropylene or polyethylene nonwoven microporous film with thickness of 20-60 µm. The separator may be coated or impregnated with additional materials to improve its performance and/or safety characteristics.

As also demonstrated by FIGS. 1 and 2, electrochemical cell 10 can be configured in a button- or coin-cell configuration with a total cell external diameter 54 and total cell height 58. The total cell external diameter 54 is preferably between about 5 mm and 25 mm, while the total cell height 58 is between about 1 mm and 10 mm. In both instances, this disclosure will be understood to encompass whole integers within these ranges, as well as any of the various standardized cell heights and widths published by industry standardization groups, such as the International Electrotechnical Commission and/or the American National Standards Institute.

It is generally understood that cells with dimensions closely matching the diameter of the human esophagus, and especially the diameter of a child's esophagus, are most likely to become lodged upon accidental ingestion. As such, cells such as CR2016 and 2025 may be most likely to become lodged in a child's esophagus, particularly to the extent that a child's esophagus is normally about 14 mm wide.

The open end 14 of the anode 12 is typically referred to as the "crimp" area of the cell, owing to the closing procedure in which end 14 may be drawn or forced inward (i.e., crimped) during the closure procedure, although other methods of closing the cell may be used. Although not illustrated, it may be possible to construct coin cells in which the cathode container is positioned around the anode container, so that in other embodiments, the crimp area may actually be indicated by the open end 22 of the cathode. In either instance, the crimp area may sometimes be coated with sealing materials to ensure that unwanted creep or leakage of electrolyte is avoided. The crimp or seal area may be of particular use for the coatings contemplated by this disclosure.

In one embodiment, a coating is provided around the crimp or seal area so as not to cover or impede the major contact surface of the anode 12 and/or cathode 20. This location is also less likely to be compromised through routine handling and installation of the battery itself, while simultaneously reducing the visual impact that the coating may have in comparison to consumer expectations.

This coating comprises an acid or pH-lowering additive provided in or on a durable coating. In one embodiment, the durable coating is dissolvable or otherwise functions to release the acid/additive when conditions arise where the electrolysis of saliva is likely, while remaining intact (i.e., undissolved) until exposed to an aqueous environment. In another embodiment, the durable coating also is configured to release the acid/additive upon exposure to a specific predetermined pH and/or temperature, such as the approximate pH of saliva (or a lower pH attained shortly after the onset of its hydrolysis) or temperatures approaching or exceeding the human body (e.g., at least 35° C. or 36.7° C.), as two non-limiting examples. In these manners, the durable coating may release substances in response to conditions similar to those when the cell is lodged within the digestive tract and, more preferably, the esophagus (e.g., rising pH levels caused by water electrolysis, temperature ranges found within the human body/esophagus, the presence of aqueous solutions similar to saliva, etc.).

As used herein, durable coating may mean a composition which actively bonds molecules, particles, or agglomerates of the acid/additive. The bonding may be chemical (e.g., ionic, covalent, polar, or hydrogen-based) and/or based on other intermolecular forces (e.g., van der Waals forces). Alternatively, the durable coating may be a solvent composition used to coat and position the acid/additive on selected portions of the cell's exterior. In some embodiments, the durable coating includes one or more compositions that vaporize or can otherwise be removed so that only the acid/additive is left adhered to the cell. In another embodiment, the durable coating is made of an edible or food safe, compound that remains on the cell with the acid/additive.

The durable coating may also be configured to serve as a thickening agent and/or a processing aid, so as to improve the flow, viscosity, and/or stability of the acid/additive. These ancillary aspects may influence the selection of a durable coating, but at least one function of the durable coating is to allow for the selective deposition of the acid/additive onto the cell, particularly along its crimp and/or other exterior sections that will not adversely affect cell performance (e.g., side walls, recessed areas that may be exposed to water if the cell is submerged but which are not readily visible or accessible, etc.).

Examples of potential durable coatings include saccharides (monosaccharide, disaccharide, polysaccharide, etc.), amylase-reacting compositions (e.g., corn starch or other similar sugars), binders (linseed oil, alklyds, acrylics, epoxys, latex, etc.), and/or alcohol, acetate, or other common solvents (e.g., methanol, ethanol, polyvinyl alcohol, ethyl acetate, vinyl acetate, etc.). Combinations of these materials are also possible, and they may be further mixed with stabilizing agents, additional bonding agents, and the like. Insofar as the durable coating is anticipated to be ingested and at least partially released into the body, in such embodiments the durable coating may be comprised of non-toxic or low-toxicity based materials. To the extent solvents are used, additional process steps to evaporate or remove the solvent may be needed, including heat, exposure to a vacuum, and/or exposure to additional solvent-removing substances.

Prior to application, the durable coating material may be dispersed with or within the acid/additive, for example in solution. This solution may then be applied on the outside of the cell, preferably on and/or near the crimp described above. The application may be accomplished by brush, spray coating, or metered/controlled dispensing via a nozzle or any other coating process that allows the coating to function as described herein. Still other methods may involve dip coating and printing techniques (e.g., screen printing, ink jet printing, etc.). Powder coating and vacuum coating of the acid/additive directly onto the cell may also be feasible.

The acid/additive is configured to provide sufficient amounts of acid (e.g., $H^+$) to neutralize hydroxide formed during the above-referenced electrolysis reactions. Insofar as a battery manufacturer controls the amount of active materials provided to the cell, it is possible to calculate the overall battery capacity and, more significantly, to predict the amount of capacity a fresh cell might deliver for electrolysis reactions. In turn, this potentially available capacity can be used to calculate/estimate the amount of acid/additive that must be provided in order to promote sufficient neutralization of hydroxide such that the cell capacity crosses below the 1.23 volt threshold for water/saliva electrolysis.

Thus, in one embodiment, the input capacity value of the coin cell is established. The input capacity value is then used to calculate the amount of hydroxide that would be produced if 100% of the battery capacity were expended (i.e., without regard to the voltage level actually produced by the battery). The amount of acid/additive required is then calculated based off this 100% theoretical amount, although lesser targets (for example, any integer between 50% and 100%). In other embodiments, the amount of acid/additive may be increased beyond the estimated value to provide a margin of safety beyond the theoretical calculation.

In another embodiment, a discharge profile is established for the coin cell. In this embodiment, the discharge profile is established in similar temperature and other conditions as might be expected if the coin cell were lodged within the digestive tract and driving an electrolysis reaction (e.g., similar pH to saliva and similar temperature to a human esophagus). The profile will monitor the voltage produced by the cell as a function of discharge capacity remaining, so as to establish at any point in time what the remaining capacity may be when the discharge voltage reaches a specific level. This profile may then further inform the amount of acid/additive provided to the durable coating. Discharge voltages of less than 1.23 volts are expected to be particularly useful to the reduction or complete elimination of tissue damage caused by electrolysis reaction products. Nevertheless, it may be possible to select other voltage cutoffs based upon empirical observations. Thus, as additional examples, 0.90, 1.00, 1.10, 1.20, 1.23, 1.30, 1.40, 1.50, 1.60, 1.75, 2.00, 2.25, 2.50, and 2.80 volts may all be voltage cutoffs or design considerations according to various embodiments.

To further exemplify one embodiment, citric acid (shown below) and its monohydrate provide three acid functional groups with only minimal additional molecular backbone and are, therefore, ideal candidates for use. In a CR2016 cell having 90 mAh of capacity, it becomes possible to calculate the moles of acid required ($1.12 \times 10^{-3}$) to neutralize all of the hydroxide potentially formed by the cell based upon these three equivalences. In one embodiment, the molecular weight and density of the acid is used to calculate the gram weight (0.22 g for pure acid, 0.24 g for monohydrate) and volume (0.13 mL of pure acid, 0.15 of monohydrate) necessary for full neutralization.

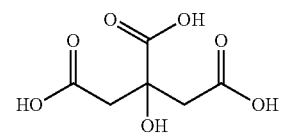 [SMILES: O=C(O)CC(O)(CC(=O)O)C(=O)O]

Any of these calculated amounts can then be reduced by a percentage corresponding to the depth of discharge at which the cell no longer delivers 1.23 volts of current (under the temperatures expected to be encountered inside the human body). In another embodiment, calculations and adjustments are made based upon a determination as to the body's tolerance of reduced pH levels.

Figure 4:
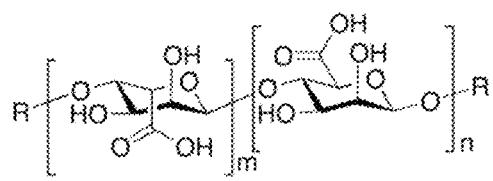
FIG. 4 illustrates alternative examples of acids according to various embodiments of the disclosure.
Figure 4:
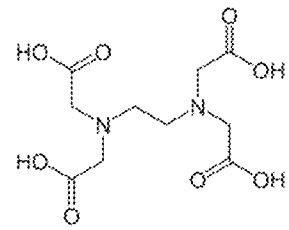
Figure 4:
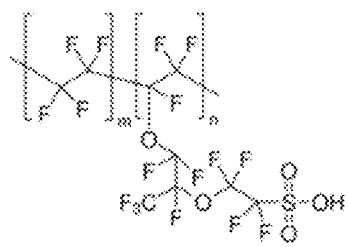
Figure 4:
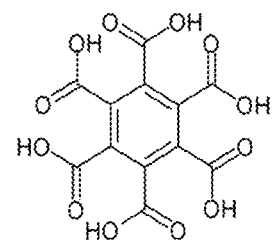
Figure 4:
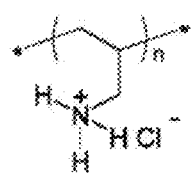
Figure 4:
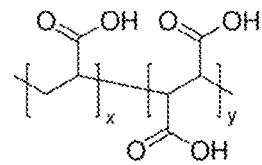
Figure 4:
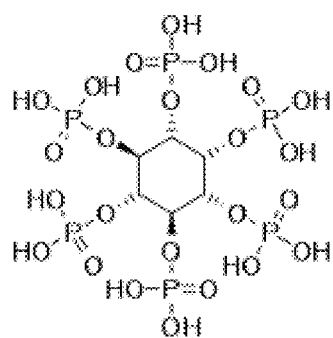

Numerous acids are amenable to use according to this procedure. By way of example, polymer coatings having acid groups are possible, including polyacids and polyelectrolytes. Examples of these materials include polyacrylic acid (e.g., carbomer, Noverite™, K-700 polymers, etc.), polystyrene sulfonic acid, polyacrylamide-based polyelectrolytes, poly(allylamine hydrochloride), poly(vinylphosphonic acid), Nafion™, polyaspartic acid, and/or naturally occurring acids such as alginic acid (found in kelp) or polyglutamic acid (found in fermented soybeans). Still other examples include benzoic, butyric, malic, tartaric, oxalic, and other organic acids. Tricarboxylic and multicarboxylic acids are also possible, including aconitic acid, isocitric acid, propane-1,2,3-tricarboxylic acid, Trimesic acid (benzene-1,3,5-tricarboxylic acid) (as well as 1,2,3 and 1,2,4), 1,2,4,5-benzenetetracarboxylic acid, benzenepentacarboxylic acid, mellitic acid (benzenehexacarboxylic acid), EDTA (ethylenediamine-tetraacetic acid), and EDDS (ethylenediamine-N,N'-disuccinic acid). Polyprotic acids, such as phytic acid, and/or mineral acids are still further possibilities. FIG. 4 indicates the structural formulae for some of these substances.

In all instances, consideration is given as to how the acid/additive will behave with the durable coating, such that the acid/additive allows the methods and devices to function as described herein. Further synergies may be realized through the combination of multiple acids and/or coating materials. The acids of the embodiments disclosed herein are selected to be sufficiently soluble after the durable coating has been dispensed with in order to permit effective reactions with the hydroxide ions.

In still other embodiments, the additive comprises a catalytic or other material that facilitates the corresponding in situ generation of acid. These materials may leverage the presence of hydrogen gas according to the reaction mechanisms described above. Additionally or alternatively, the reliance on other reaction products (noted above) or conditions specific to the esophagus may form additional possibilities to accomplish this neutralization. Also, it may be possible to deliberately create chemical intermediaries which eventually result in the formation of pH reducing compounds and conditions, rather than directly forming $H^+$ from the acid/additive.

Given variables influencing the electrolysis reaction and potential injury-inducing conditions, empirical test may be used to determine the efficacy of a particular combination of materials will be through empirical testing. In one embodiment, a method for such tests is contemplated. The test comprises placing the coin cells for testing, along with a control, between two pieces of simulated tissue (e.g., slices of ham or the like). The cells are wetted with saliva or synthetic saliva on a regular basis and light pressure (e.g., 0.50 to 3.00 kg) is applied. The simulated tissue is periodically inspected for potential burning and/or other damage during the progress of the test. Qualitative observations can be made in comparison to the control group. Additional, more quantitative bases may be possible, including the measurement of pH at standardized locations relative to each cell being tested, temperature monitoring, metallic dissolution of the cell casings, and/or comparative spectral analysis of the colors produced on simulated tissue, particularly on the negative terminal side.

Figure 3A:
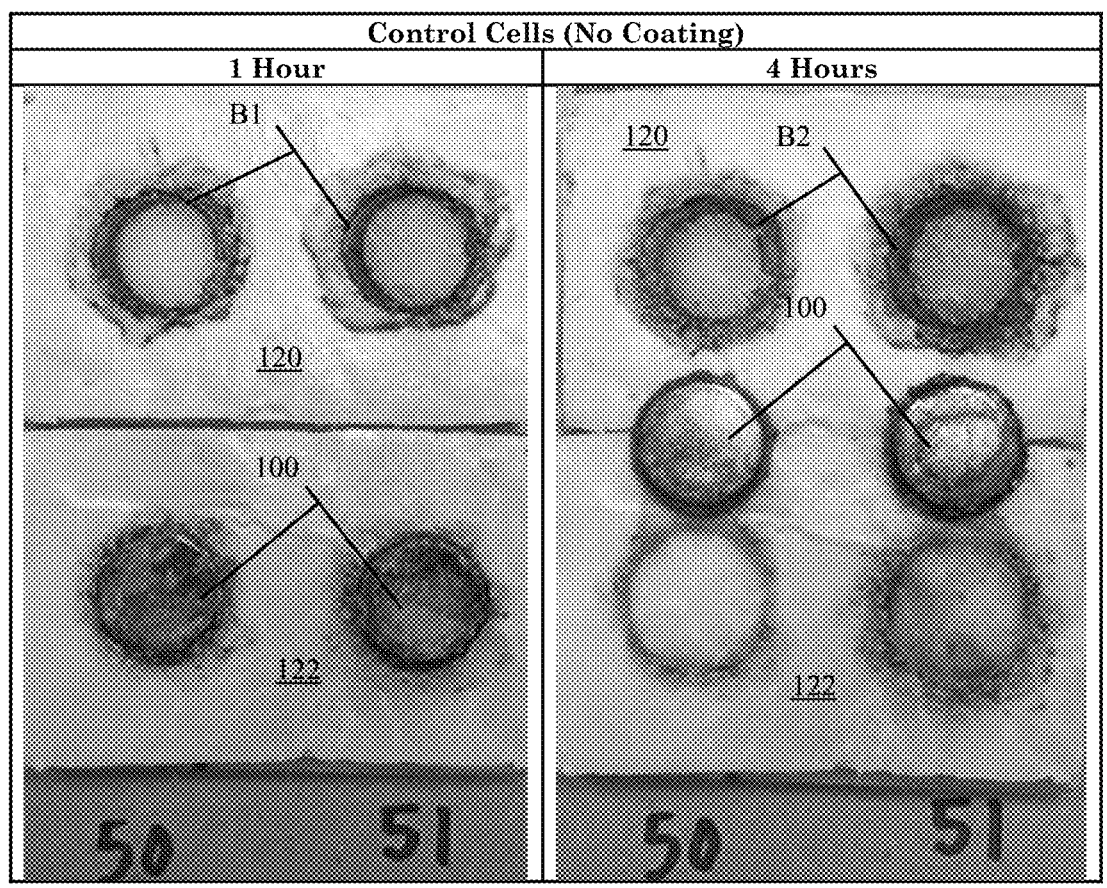
FIGS. 3A and 3B are photographs of coin cell batteries at various points in time while undergoing simulated conditions of ingestion.
Figure 3B:
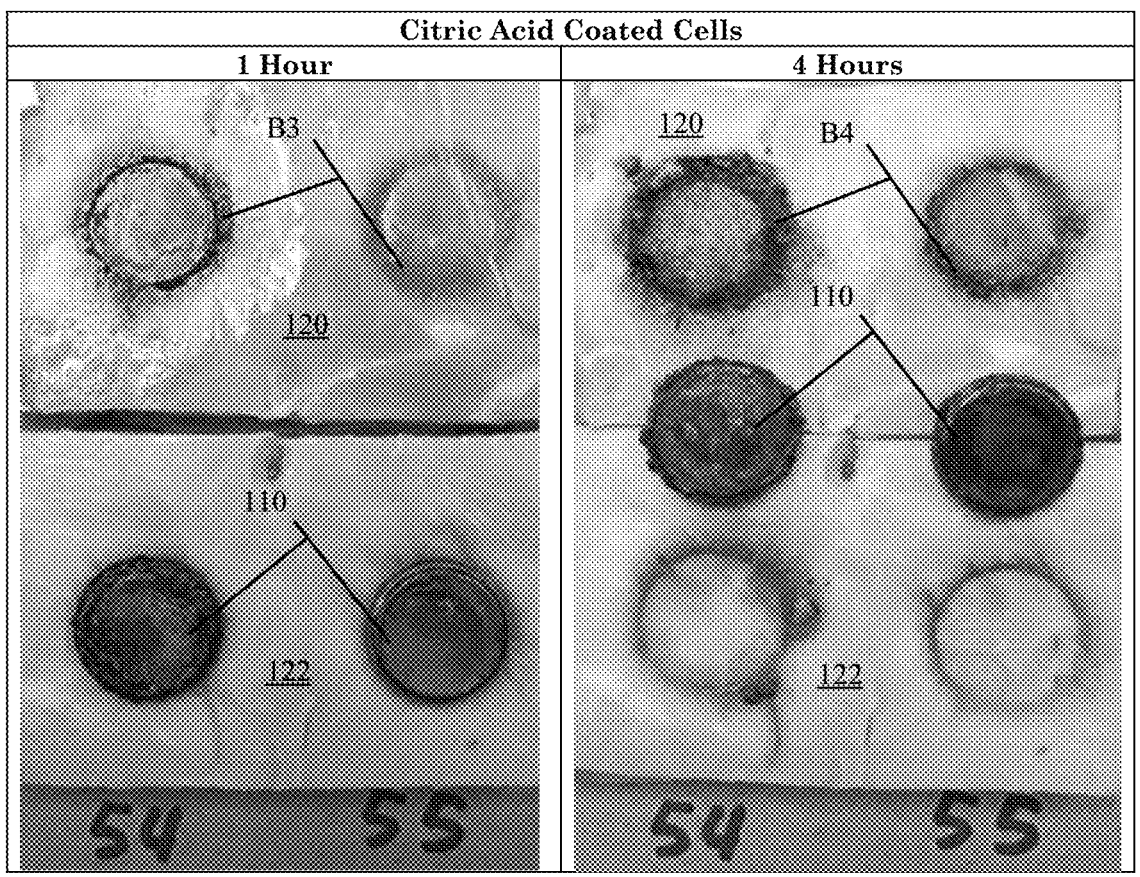

FIG. 3A is a photograph showing the time-lapse effects of a pair of control CR2032 cells at 1 hour and upon completion of the comparative analysis (testing) after 4 hours, while FIG. 3B are CR2032 cells having 0.3 g of citric acid evenly coated around its crimp region by way of a solvent-based technique also at 1 hour and 4 hours (i.e., so that only citric acid was present on the cell casing prior to testing). Notably, this amount of citric acid is only one half of the theoretical amount necessary if 100% of the coin cell's capacity were devoted to production of hydroxide by way of hydrolysis.

Two separate control cells 100 (noted individually by handwritten lot numbers 50 and 51 along the bottom edge of the photographs) in FIG. 3A and two separate coated cells 110 (noted individually by handwritten lot numbers 54 and 55 along the bottom edge of the photographs) in FIG. 3B are shown. Notably, the cells were periodically provided with similar amounts of synthetic saliva at fixed points in time so as to allow for relevant comparison of the control cells 100 and coated cells 110. In each instance, the cells remained in contact with simulated tissue piece 122 at the 1 hour point of the comparative test so as to minimize any distortion of the resulting burn marks B1 through B4. At 4 hours of elapsed time in each test, control cells 100 and citric-acid coated cells 110 were moved from their original positioning between simulated tissue pieces 120, 122 so as to allow for better inspection of the tissue.

Upon qualitative visual inspection, black burn marks B1 and B2 caused by control cells 100 appear to be darker and more severe than burn marks B3 and B4 associated with coated cells 110, particularly with respect to lot 55. Separately, the indications on tissue sample 122 did not appear to be burns and, instead, were greenish discolorations believed to be associated with other processes. Although not qualitatively expressed in either FIG. 3A or FIG. 3B, the inventors also noted audible noise and detected the scent of burning tissue as further confirmation of ongoing reactions.

While the embodiments above are expected to have particular applicability to primary lithium coin cell batteries having a nominal voltage of 3.0 volts, the coatings and methods could be applied to other battery types. For example, secondary cells may utilize these features, as well as other battery chemistries that are not necessarily reliant upon lithium as an active material. Also, primary and secondary batteries having other nominal voltages (including, but not limited, voltages above 3.0 volts) may be suited to these features, with any battery type producing discharge voltage at or above 1.23 volts for extended periods of time being a potential candidate.

Embodiments have been described above and modifications and alterations will occur to others upon the reading and understanding of this specification. The foregoing description and any claims are intended to include all modifications and alterations insofar as they come within the scope of the claims or the equivalent thereof.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A coin cell, comprising:
    an outer surface comprising a positive contact surface and a negative contact surface; and
    a coating consisting essentially of an adhesive and a pH reducing substance, wherein the coating is disposed on at least a portion of the outer surface of the coin cell, and
    wherein the coating is formulated to release the pH reducing substance from the coating upon being subjected to a predetermined condition of pH and/or temperature.

2. The coin cell according to claim 1, further comprising a crimp or seal area adjacent the positive contact surface and the negative contact surface, wherein the coating is disposed on at least a portion of the crimp or seal area.

3. The coin cell according to claim 1, wherein the pH reducing substance is an acidic substance.

4. The coin cell according to claim 3, wherein the acidic substance is citric acid.

5. The coin cell according to claim 3, wherein the acidic substance is a food grade acid suitable for human consumption.

6. The coin cell of claim 1, wherein the pH reducing substance is a catalytic substance that facilitates in situ generation of acid when exposed to saliva.

7. The coin cell of claim 1, wherein the coating is dissolvable in saliva.

8. The coin cell of claim 1, wherein the coin cell has an initial voltage potential in an undischarged state and wherein the coin cell causes generation of an alkaline solution when the coin cell has a voltage potential above a thermodynamic voltage level and the coin cell is discharged in saliva, and wherein: the coating comprises an amount of pH reducing substance to neutralize the alkaline solution generated during discharge of the coin cell from the initial voltage potential to the thermodynamic voltage in saliva.

9. A method for mitigating harmful effects of human ingestion of a coin cell, the method comprising:
applying a coating to at least a portion of the outer surface of the coin cell, the coating consisting essentially of an adhesive and a pH reducing substance;
wherein the coating is disposed on at least a portion of the outer surface of the coin cell, and
wherein the coating is formulated to release the pH reducing substance from the coating upon being subjected to a predetermined condition of pH and/or temperature.

10. The method according to claim 9 further comprising dispersing the pH reducing substance in an adhesive prior to or concurrent with applying the coating.

11. The method according to claim 9, wherein applying the coating to at least a portion of the outer surface of the coin cell comprises: dispersing the pH reducing substance in a solvent-based solution; applying the solvent to at least a portion of the outer surface of the coin cell; curing the solvent-based solution to adhere the pH reducing substance relative to the outer surface of the coin cell.

12. The method according to claim 9, wherein applying the coating to at least a portion of the outer surface of the coin cell comprises: applying the coating to at least a portion of a crimp or seal area located adjacent the positive contact surface and the negative contact surface.

13. The method according to claim 9, wherein applying the coating to at least a portion of the outer surface of the coin cell comprises: applying an amount of the coating to neutralize an alkaline solution generated when the coin cell is discharged from an initial voltage potential to a thermodynamic voltage in saliva, wherein the initial voltage potential is the voltage potential of the coin cell in an undischarged state and the thermodynamic voltage is the minimum voltage level for generation of the alkaline solution when the coin cell is discharged in saliva.

14. A coating for mitigating harmful effects of human ingestion of a coin cell, the coating consisting essentially of:
an adhesive, and
a pH reducing substance, wherein the pH reducing substance is dispersed in the coating, and
wherein the coating is formulated to be a food grade coating and wherein the coating is formulated to release the pH reducing substance from the coating upon being subjected to a predetermined condition of pH and/or temperature.

15. The coating of claim 14, wherein the pH reducing substance is an acidic substance.

16. The coating of claim 15, wherein the acidic substance is citric acid.

17. The coating of claim 14, wherein the coating is dissolvable in saliva.

18. The coating of claim 14, wherein the pH reducing substance is a catalytic substance that facilitates in situ generation of acid when exposed to saliva.

* * * * *